3,341,532
SUBSTITUTED 7-ACETYLAMINO
CEPHALOSPORANIC ACIDS
Benjamin Arthur Lewis, Suffern, and Martin Leon Sassiver, Pearl River, N.Y., and Robert Gordon Shepherd, Ridgewood, N.J., assignors to American Cyanamid Company, Stamford, Conn., a corporation of Maine
No Drawing. Filed Feb. 15, 1967, Ser. No. 616,170
10 Claims. (Cl. 260—243)

ABSTRACT OF THE DISCLOSURE

This disclosure describes compounds of the class of 7-(phenylmalonylamino)cephalosporanic acids, 7-(naphthylmalonylamino)cephalosporanic acids, 7-(α-carboxamidophenylacetylamino)cephalosporanic acids and 7-(α-carboxamidonaphthylacetylamino)cephalosporanic acids; useful as anti-bacterial agents.

BRIEF SUMMARY OF THE INVENTION

This invention relates to new derivatives of 7-aminocephalosporanic acid and, more particularly, is concerned with novel compounds which may be represented by the following general formula:

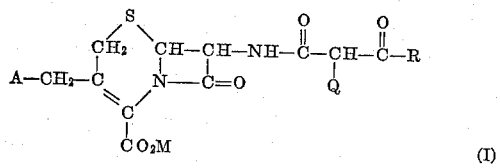

(I)

wherein R is hydroxy or amino; A is acetoxy or N-pyridinium; M is hydrogen, pharmaceutically acceptable non-toxic cations or an anionic charge when A is N-pyridinium; and Q is 1-naphthyl, 2-naphthyl or a moiety of the formula:

wherein R' is hydrogen, halogen, nitro or lower alkyl. Suitable lower alkyl groups are those having from 1 to 4 carbon atoms such as methyl, ethyl, isopropyl, n-butyl, etc. Halogen is exemplified by fluoro, chloro and bromo.

DETAILED DESCRIPTION OF THE INVENTION

In the general Formula I set forth above, in those instances where A is N-pyridinium, the cationic charge on this group is matched by the anionic charge of the carboxylic acid radical, the entire molecule being of a zwitterion nature and M is thus an anionic charge. Typical compounds represented by the above general Formula I are, for example, 7-(phenylmalonylamino)cephalosporanic acid,
7-(o-chlorophenylmalonylamino)cephalosporanic acid,
7-(o-nitrophenylmalonylamino)cehpalosporanic acid,
7-(m-chlorophenylmalonylamino)cephalosporanic acid,
7-(p-isopropylphenylmalonylamino)cephalosporanic acid,
7-(1-naphthylmalonylamino)cephalosporanic acid,
7-(α-carboxamido-2-naphthylacetylamino)cephalosporanic acid,
7-(α-carboxamidophenylacetylamino)cephalosporanic acid,
7-(α-carboxamido-m-bromophenylacetylamino)cephalosporanic acid,
7-(α-carboxamido-p-chlorophenylacetylamino)cephalosporanic acid,
7-(phenylmalonylamino)-3-(1-pyridylmethyl)-3-cephem-4-carboxylic acid betaine,
7-(m-nitrophenylmalonylamino)-3-(1-pyridylmethyl)-3-cephem-4-carboxylic acid betaine,
7-(α-carboxamidophenylacetylamino)-3-(1-pyridylmethyl)-3-cephem-4-carboxylic acid betaine, and
7-(α-carboxamido-1-naphthyl-acetylamino)-3-(1-pyridylmethyl)-3-cephem-4-carboxylic acid betaine.

Also embraced within the scope of the present invention are the non-toxic, pharmaceutically acceptable salts of these derivatives of 7-aminocephalosporanic acid. Included are the monobasic salts when R is amino and the dibasic salts when R is hydroxy. The cations comprised in these salts and embraced by M include, for example, the non-toxic metal cations such as the sodium ion, potassium ion, calcium ion, magnesium ion as well as the organic amine cations, such as the tri(lower alkyl)amine cations (e.g. triethylamine), procaine, and the like.

The novel compounds of the present invention, when A is acetoxy in Formula I above, may be readily prepared by acylating 7-aminocephalosporanic acid with a compound of the formula:

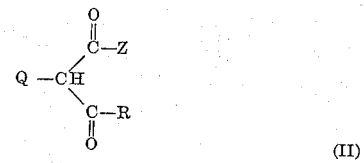

(II)

wherein R and Q are as hereinbefore defined, and Z is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic condensing agent such as sodium bicarbonate or potassium bicarbonate, or an organic base such as one of the organic bases listed hereinbefore. The reaction is also preferably carried out at a temperature of from about 0° C. to about 25° C., preferably at 0° C.–5° C., and over a period of time of a few hours or more. Where R is hydroxy, the diacid halide, azide or ester is condensed with 7-aminocephalosporanic acid under conditions to give monoacylation and then hydrolyzed during the work-up and separation of isomers to give the desired product.

The acylating agents corresponding to Formula II, when new, may be prepared by methods well-known in the art from the corresponding acid (Z is hydroxy). Thus, the acid can be treated with thionyl chloride or oxalyl chloride, if desired in the presence of dimethylformamide, to yield the corresponding acyl chlorides (Z is chlorine), which, if desired, can be converted to the acyl azides (Z is $N_3$) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York, N.Y.). Specific acylating agents operable in this process (when R is amino) include, for example, α-carboxamidophenylacetyl chloride, α-carboxamido-1-naphthylacetyl bromide, α-carboxamido-2-naphthylacetyl azide, p-nitrophenyl α-carboxamido-m-bromo-phenylacetate, α-carboxamido-p-chlorophenylacetyl chloride, and the like. Specific acylating agents operable in this process (where R is hydroxy) include, for example, phenylmalonic acid diacid chloride, o-chlorophenylmalonic acid diacid bromide, o-nitrophenylmalonic acid diazide, m-chlorophenylmalonic acid di-p-nitrophenyl ester, p-isopropylphenylmalonic acid diazide, m-nitrophenylmalonic acid diacid bromide, 1-naphthylmalonic acid diacid chloride, and the like. The intermediate arylmalonic acids (Z and R are hydroxy) and the intermediate α-carboxamidoarylacetic acids (Z is hydroxy and R is amino) may be readily prepared from the corresponding arlyacetic acids and arylacetamides, respectively, by procedures well known in the art.

The novel compounds of the present invention, when A is N-pyridinum in Formula I above, may be readily prepared from the corresponding 7-aminocephalosporanic acid derivatives (A is acetoxy in Formula I above) by treatment with pyridine in water or aqueous acetone at 20–50° C. and for a period of time of about 1–3 days. The resulting 3-(1-pyridylmethyl)-3-cephem-4-carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have broad-spectrum antimicrobial activity in vitro against standard laboratory microorganisms used to screen for activity against pathogens. The antibacterial spectrum of a typical compound of the present invention, representing the concentration required to inhibit the growth of various typical bacteria, was determined in a standard manner by the agar-dilution streak-plate technique which is commonly used in testing new antibiotics. The following table summarizes the in vitro activity of 7-(phenylmalonylamino)cephalosporanic acid (1) as compared with Cephalosporin C (2) against a variety of disease-causing microorganisms.

| Organisms | Minimal inhibitory conc. (mcg./ml.) | |
|---|---|---|
| | (1) | (2) |
| Staphylococcus aureus No. 11 | 1.56 | 100 |
| Staphylococcus aureus ATCC 13709 | 0.39 | 50 |
| Streptococcus pyrogenes C-203 | 0.39 | 25 |
| Bacillus cereus ATCC 10702 | 1.56 | 100 |
| Salmonella typhosa ATCC 6539 | 6.25 | 12.5 |
| Proteus mirabilis ATCC 9921 | 12.5 | 25 |
| Escherichia coli ATCC 9637 | 100 | 50 |
| Klebsiella pneumoniae KAD | 12.5 | 25 |
| Shigella shiga | 6.25 | 25 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos, and topical compositions for the treatment of wounds and burns.

The invention will be described in greater detail in conjunction with the following specific examples.

*Example 1.—Preparation of 7-(phenylmalonylamino) cephalosporanic acid*

Phenylmalonic acid (360 mg., 2 mmole) was converted to its diacid chloride with oxalyl chloride. The diacid chloride in acetone (20 ml.) was added to a stirred solution of 7-aminocephalosporanic acid (545 mg., 2 mmole) and sodium bicarbonate (672 mg., 8 mmole) in water (40 ml.) and acetone (20 ml.) which was kept between 0° C. and 5° C. The reaction was stirred for 2 hours at this temperature, and then the acetone was removed under reduced pressure. The aqueous solution was acidified to pH 1 with hydrochloric acid and the mixture extracted with ethyl acetate (3× 50 ml.), the ethyl acetate solution was washed with water (100 ml.) and dried over magnesium sulfate. Evaporation of the solvent under reduced pressure gave 7-(phenylmalonylamino)cephalosporanic acid. The sodium salt was obtained by slurrying this product in water (10 ml.) and adding 2 N sodium hydroxide dropwise to pH 5 to effect solution. The solution was concentrated to small volume in a rotary evaporator at <50° C., and the sodium salt was precipitated by the addition of acetone. The precipitate was collected by filtration and dried to give 715 mg. of the disodium salt of 7-(phenylmalonylamino) cephalosporanic acid as an ivory solid.

*Example 2.—Preparation of 7-(α-carboxamidophenylacetylamino)cephalosporanic acid*

By replacing the phenylmalonyl dichloride employed in Example 1 with an equimolecular quantity of α-carboxamidophenylacetyl chloride and following substantially the same procedure described in Example 1, there is obtained the 7-(α-carboxamidophenylacetylamino)cephalosporanic acid.

*Example 3.—Preparation of 7-(m-chlorophenylmalonylamino)cephalosporanic-acid*

The procedure of Example 1 is repeated, substituting an equimolecular amount of m-chlorophenylmalonyl dibromide for the phenylmalonyl dichloride employed in that example. There is thus obtained the 7-(m-chlorophenylmalonylamino)cephalosporanic acid.

*Example 4.—Preparation of 7-(α-carboxamido-o-bromophenylacetylamino)cephalosporanic acid*

In place of the phenylmalonyl dichloride of Example 1, there is employed an equimolecular quantity of α-carboxamido-o-bromophenylacetyl azide whereby the 7 - (α - carboxamido - o - bromophenylacetylamino) cephalosporanic acid is obtained in equally good yield.

*Example 5.—Preparation of 7-(o-nitrophenylmalonylamino)cephalosporanic acid*

In the manner described in Example 1, treatment of 7-aminophalosporanic acid with o-nitrophenylmalonyl dichloride produces the 7-(o-nitrophenylmalonylamino) cephalosporanic acid.

*Example 6.—Preparation of 7-(phenylmalonylamino)-3-(1-pyridylmethyl)-3-cephem-4-carboxylic acid betaine*

One gram of the sodium salt of 7-(phenylmalonylamino)cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

*Example 7. — Preparation of 7-(α-carboxamidophenylacetylamino) - 3 - (1 - pyridiylmethyl) - 3 - cephem-4-carboxylic acid betaine*

One gram of the sodium salt of 7-(α-carboxamidophenylacetylamino)cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

*Example 8.—Preparation of 7-(1-naphthylmalonylamino) cephalosporanic acid*

By replacing the phenylmalonyl dichloride employed in Example 1 with an equimolecular quantity of 1-naphthylmalonyl dichloride and following substantially the same procedure described in Example 1, there is obtained the 7-(1-naphthylmalonylamino)cephalosporanic acid.

*Example 9.—Preparation of 7-(2-naphthylmalonylamino) cephalosporanic acid*

The procedure of Example 1 is repeated, substituting an equimolecular amount of 2-naphthylmalonyl dichloride for the phenylmalonyl dichloride employed in that example. There is thus obtained the 7-(2-naphthylmalonylamino)cephalosporanic acid in equally good yield.

What is claimed is:

1. A compound selected from the group consisting of those of the formula:

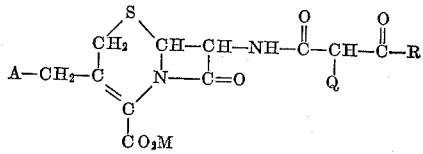

wherein R is selected from the group consisting of hydroxy and amino; A is selected from the group consisting of acetoxy and N-pyridinium; M is selected from the group consisting of hydrogen, pharmaceutically acceptable non-toxic cations and an anionic charge when A is N-pyridinium; and Q is selected from the group consisting of 1-naphthyl, 2-naphthyl and a moiety of the formula:

wherein R' is selected from the group consisting of hydrogen, halogen, nitro and lower alkyl; and the non-toxic pharmaceutically acceptable basic salts thereof when R is hydroxy.

2. A compound according to claim 1 wherein R is hydroxy, A is acetoxy, M is hydrogen and Q is phenyl.

3. A compound according to claim 1 wherein R is hydroxy, A is n-pyridinium, M is an anionic charge and Q is phenyl.

4. A compound according to claim 1 wherein R is amino, A is acetoxy, M is hydrogen and Q is phenyl.

5. A compound according to claim 1 wherein R is amino, A is N-pyridinium, M is an anionic charge and Q is phenyl.

6. A compound according to claim 1 wherein R is hydroxy, A is acetoxy, M is hydrogen and Q is meta-chlorophenyl.

7. A compound according to claim 1 wherein R is amino, A is acetoxy, M is hydrogen and Q is ortho-bromophenyl.

8. A compound according to claim 1 wherein R is hydroxy, A is acetoxy, M is hydrogen and Q is ortho-nitrophenyl.

9. A compound according to claim 1 wherein R is hydroxy, A is acetoxy, M is hydrogen and Q is 1-naphthyl.

10. A compound according to claim 1 wherein R is hydroxy, A is acetoxy, M is hydrogen and Q is 2-naphthyl.

References Cited

UNITED STATES PATENTS 3,225,038  12/1967  Flynn.

NICHOLAS S. RIZZO, *Primary Examiner.*